United States Patent Office 3,795,668
Patented Mar. 5, 1974

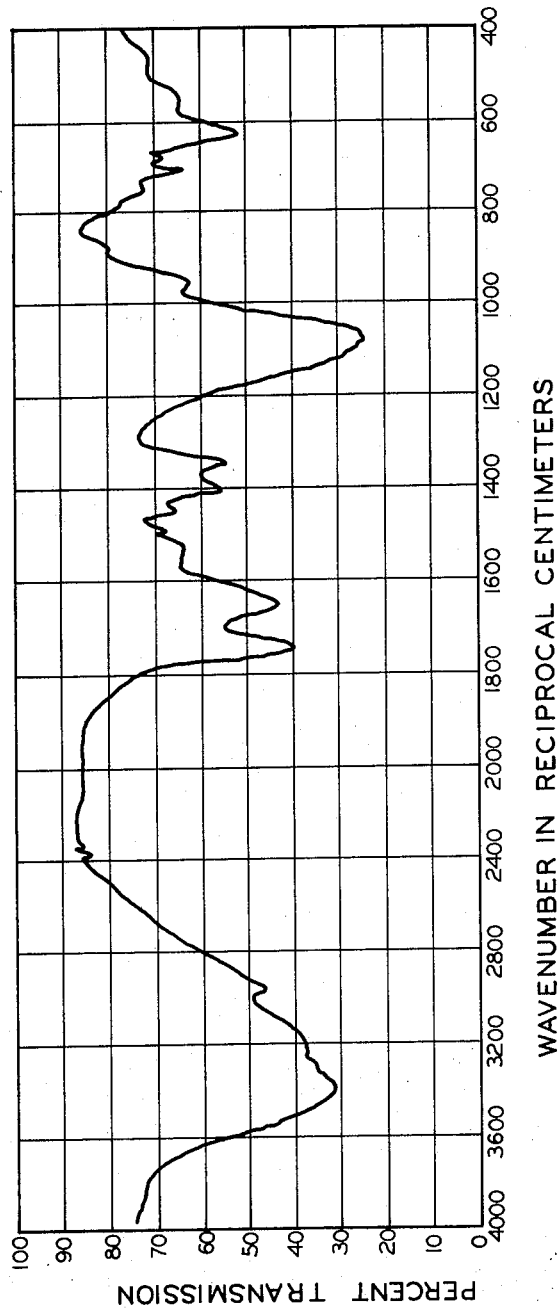

3,795,668
POLYAMINE COMPOUNDS AND METHODS
FOR THEIR PRODUCTION
James C. French, St. Clair Shores, Lucia E. Anderson, Harper Woods, Richard H. Bunge, Mount Clemens, and John D. Howells, Grosse Pointe Woods, Mich., assignors to Parke, Davis & Company, Detroit, Mich.
Filed Nov. 15, 1971, Ser. No. 198,827
Int. Cl. C07c 129/18
U.S. Cl. 260—210 AB
5 Claims

ABSTRACT OF THE DISCLOSURE

The antibacterial substance myomycin including its individual components A, B, and C and acid-addition salts. The products can be produced by fermentation of Nocardia sp. J327 under artificial conditions. They have a wide spectrum of antibacterial activity. By chemical degradation studies, myomycin B sulfate is converted to a variety of structural fragments including myo-inositol and 3-amino-3-deoxy-D-mannose.

SUMMARY AND DETAILED DESCRIPTION

The present invention relates to new antibacterial compounds. More particularly, it relates to a product called myomycin, to individual components thereof called myomycin A, myomycin B, and myomycin C, to acid-addition salts, and to methods for the production of the foregoing compounds.

The product of the invention as it is normally produced has been given the name myomycin, designating the free base form. Myomycin, preferably in acid-addition salt form, can be isolated, identified, characterized, and used as such. Alternatively, myomycin can be separated into individual components called myomycin A, myomycin B, and myomycin C, again designating the free base forms. Each of these, preferably in acid-addition salt form, can be isolated, identified, characterized, and used separately. When not otherwise qualified, the term myomycin as used herein refers to a mixture of myomycin A, myomycin B, and myomycin C, or to any single component or mixture of two components when the distinction is of little or no significance. Myomycin as normally obtained from fermentation broths according to the invention contains a major proportion (about 80% or more) of myomycin B, a minor proportion (about 10% or less) of myomycin A, and a minor proportion (about 10% or less) of myomycin C. Fractionation experiments indicate a somewhat greater amount of myomycin A than of myomycin C.

Myomycin A, myomycin B, and myomycin C are similar in chemical structures and qualitatively similar in antibacterial properties.

Myomycin and its individual components are basic substances. In free base form they contain the elements carbon, hydrogen, oxygen, and nitrogen. They have free amino groups and form acid-addition salts with a variety of organic and inorganic acids such as acetic, propionic, maleic, malic, citric, pamoic, methanesulfonic, gluconic, hydrochloric, hydrobromic, phosphoric, sulfuric, and related acids. The acid-addition salts with common salts are water-soluble. Myomycin is unstable under basic conditions. For this reason myomycin and its individual components, according to the invention, are isolated and used as acid-addition salts.

The form in which myomycin has usually been isolated is the sulfate salt form of a mixture containing a major proportion of myomycin B and minor proportions of myomycin A and myomycin C. This sulfate salt form is a white, amorphous solid, readily soluble in water and nearly insoluble in methanol, ethanol, ethyl acetate, chloroform, and acetone. A convenient method for obtaining other salt forms is by passing an aqueous solution of the sulfate over an anion exchange resin. A resin such as Dowex 1 X2 in the chloride, acetate, or other salt form can be used. Myomycin hydrochloride and myomycin acetate are both amorphous salts that are very soluble in water and more soluble in methanol than is myomycin sulfate.

Myomycin sulfate (mixture of components) decomposes over a wide temperature range beginning about 200° C. Elemental analysis (indicative of a hydrate) shows 34.36% carbon, 6.18% hydrogen, 13.23% nitrogen, and 7.07% sulfur. It has a $pK'_a$ value of 8.0 in water. It has a characteristic infrared absorption spectrum in potassium bromide with absorption maxima at 3430 (broad), 2938, 1738, 1643, 1498, 1457, 1405, 1350, 1070, 973, 700, and 612 reciprocal centimeters. It shows no ultraviolet absorption maxima between 220 and 360 millimicrons. The specific rotation $[\alpha]_D^{25} = -3.7°$ (2% in water). It gives positive reactions in the ninhydrin and Sakaguchi tests, and negative reactions in the maltol and Elson-Morgan tests.

Myomycin hydrochloride (mixture of components) decomposes over a wide temperature range beginning at about 170° C. Elemental analysis (indicative of a hydrate) shows 36.56% carbon, 6.44% hydrogen, 13.87% nitrogen, 16.13% chlorine, 27.06% oxygen, and 0.0% sulfur. It has a $pK'_a$ value of 8.0 in water. It has a characteristic infrared absorption spectrum in potassium bromide with absorption maxima at 3430 (broad), 2935, 1735, 1650, 1497, 1457, 1403, 1350, 1160, 1118, 1073, 1035, 752, and 702 reciprocal centimeters. The specific rotation $[\alpha]_D^{25} = -2.7°$ (1.11% in water).

Myomycin acetate (mixture of components) decomposes over a wide temperature range beginning at about 125° C. It has $pK'_a$ values of 4.5 and 7.9. It has a characteristic infrared absorption spectrum in potassium bromide with absorption maxima at 3425 (broad), 2935, 1734, 1648, 1563, 1497, 1408, 1345, 1165, 1120, 1073, 703, and 655 reciprocal centimeters. The specific rotation $[\alpha]_D^{25} = -2.7°$ (2.11% in water).

Myomycin B sulfate decomposes over a wide temperature range beginning above 200° C. Elemental analysis shows 33.81% carbon, 6.26% hydrogen, 13.32% nitrogen, and 6.49% sulfur. These experimentally determined values correspond to the empirical formula $$C_{27}H_{51}N_9O_{14} \cdot 2H_2SO_4 \cdot 2H_2O$$

The amount of nitrogen measured by the Van Slyke method is 4.03%. Myomycin B sulfate has a $pK'_a$ value of substantially 8.0 in water. It has a characteristic infrared absorption spectrum in potassium bromide as shown in the drawings, with absorption maxima at 3420 (broad), 2940, 1735, 1645, 1498, 1458, 1405, 1350, 1074, 975, 702, and 617 reciprocal centimeters. It shows no ultraviolet absorption maxima between 220 and 360 millimicrons. The specific rotation $[\alpha]^{25}$ at various wavelengths (1.74% in water) is as follows: at 589 millimicrons, $-5.3°$; 578 millimicrons, $-5.5°$; 546 millimicrons, $-6.0°$; 436 millimicrons, $-9.7°$; and 365 millimicrons, $-13.5°$. It gives positive reactions in the ninhydrin and Sakaguchi tests, and negative reactions in the maltol and Elson-Morgan tests.

Chemical degradation (hydrolysis) studies to determine the chemical structure of myomycin have been carried out primarily using myomycin B sulfate as a starting material.

A solution of 1.008 g. of myomycin B sulfate in 120 ml. of 3.5 N hydrochloric acid was heated at 97° C. for 22 hours. The products obtained included myo-inositol and L-β-lysine (isolated and identified as sulfate salt).

A solution of 1.54 g. of myomycin B sulfate in 77 ml. of water was treated with 51 ml. of 0.51 N barium hydroxide. The mixture was allowed to stand for 41 hours at 25° C. and then adjusted to pH 4.2 with sulfuric acid. The products obtained included x-(3-deoxy-3-guanidino-D-mannopyranosyl)-myo-inositol (isolated and identified as hydrochloride salt) and N-(L-β-lysyl)-L-β-lysine.

A solution of 2.39 g. of myomycin B sulfate in 33 ml. of water was treated with 137 ml. of 0.25 N barium hydroxide. After 12 minutes the resulting mixture was adjusted to pH 4.3 with 2 N sulfuric acid and then stored at 3° C. overnight. The products obtained included a bis-carbamoyl derivative of x-(3-deoxy-3-guanidino-D-mannopyranosyl)-myo-inositol (isolated and identified as sulfate salt) and N-(L-β-lysyl)-L-β-lysine (isolated and identified as acetate salt).

A mixture of 1.05 g. of myomycin sulfate (mixture of components), 7.5 g. of barium hydroxide octahydrate, and 80 ml. of water was heated at 97° C. for 14 hours. The products obtained included x-(3-deoxy-3-ureido-D-mannopyranosyl)-myo-inositol and x-(3-amino-3-deoxy-D-mannopyranosyl)-myo-inositol.

A solution of 98 mg. of x-(3-amino-3-deoxy-D-mannopyranosyl)-myo-inositol (as obtained above) in 10 ml. of 3 N hydrochloric acid was heated at 97° C. for 2 hours. The products obtained included myo-inositol and 3-amino-3-deoxy-D-mannose (isolated and identified as hydrochloride salt).

The chemical degradation studies described above provide evidence of the novelty of myomycin. As far as is known, this is the first time that 3-amino-3-deoxy-D-mannose has been shown to be a structural unit of an antibiotic and the first time that myo-inositol has been shown to be a structural unit of a water-soluble basic antibiotic.

The chemical degradation studies support the following structure for myomycin B, anhydrous free base form.

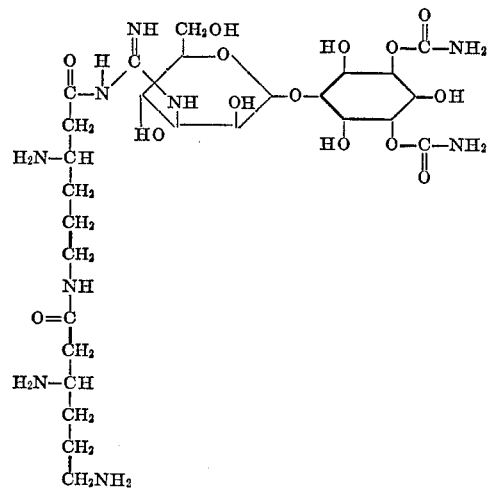

O - [3 - [[(L) - 3 - amino - 6 - [(3L) - 3,6 - diaminohexan-amido]hexanoyl]guanidino] - 3 - deoxy - D - mannopyranosyl] - myo - inositol, di - O - carbamate ester Acid-addition salts of myomycin and its components have similar antibacterial activities, although quantitatively somewhat different. The antibacterial activity is illustrated by the antibacterial spectrum shown in the following Table 1. In this table the antibacterial activity of myomycin sulfate (mixture of components) is expressed in terms of the minimal inhibitory concentration, measured as micrograms per ml. of medium, against various species of bacteria. The data reported in Table 1 were obtained using representative strains of the designated organisms. Where more than a single strain of an organism is indicated, the range of minimal inhibitory concentrations illustrates the variability observed for different strains of the single species. The medium used for growth was Trypticase Soy Broth. This medium contains, per liter of distilled water, 17 g. of peptone derived from casein by pancreatic digestion, 3 g. of papaic digest of soya meal, 5 g. of sodium chloride, 2.5 g. of dipotassium phosphate, and 2.5 g. of dextrose.

TABLE 1.—IN VITRO ANTIBACTERIAL SPECTRUM OF MYOMYCIN SULFATE

| Microorganism | Number of strains | Minimal inhibitory concentration, micrograms/ml. |
|---|---|---|
| Staphylococcus aureus | 3 | 0.8->100 |
| Streptococcus faecalis | 2 | >100 |
| Streptococcus pyogenes | 2 | 0.4-50 |
| Aerobacter aerogenes | 5 | 1.6->100 |
| Escherichia coli | 3 | 6.3-25 |
| Klebsiella pneumoniae | 6 | <0.1-6.3 |
| Serratia marcescens | 6 | 12.5-25 |
| Salmonella enteritidis | 1 | 3.1 |
| Salmonella paratyphi | 1 | 3.1 |
| Salmonella typhimurium | 1 | 12.5 |
| Shigella flexneri | 3 | 12.5 |
| Shigella sonnei | 3 | 6.3-50 |
| Proteus mirabilis | 1 | 50 |
| Proteus morganii | 1 | 25 |
| Proteus rettgeri | 1 | <100 |
| Proteus vulgaris | 1 | 100 |
| Pseudomonas aeruginosa | 7 | 25->100 |
| Pseudomonas pseudomallei | 3 | 100->100 |

The antibacterial activity of myomycin sulfate (mixture of components) has also been demonstrated in experimental acute infections in mice. Single subcutaneous doses of approximately 5 mg./kg. body weight or less are effective against infections with *Staphylococcus aureus, Escherichia coli, Klebsiella pneumoniae,* and *Shigella sonnei.* In vivo activity in mice has also been observed against *Proteus mirabilis, Proteus vulgaris, Pseudomonas aeruginosa,* and *Salmonella typhimurium.*

The mean single dose of myomycin (mixture of components, admistered as the sulfate salt) that is lethal for half the mice in a group ($LD_{50}$) has been determined as >7,950 mg. base equivalent/kg. body weight by the oral route; 646±19 mg. base equivalent/kg. by the intraperitoneal route; and 129±4 mg. base equivalent/kg. by the intravenous route. The comparable acute $LD_{50}$ values in rats have been determined as >7,950 mg. base equivalent/kg. body weight by the oral route; 832±23 mg. base equivlent/kg. by the intraperitoneal route; and 209±3 mg. base equivalent/kg. by the intravenous route.

Myomycin including its individual components and acid-addition salts thereof can be produced in accordance with the invention by cultivating the organism Nocardia sp. J327 under artificial conditions.

An original isolate of Nocardia sp. J327 has been obtained from a soil sample collected near Crosby, N. Dak. Subcultures of this original isolate and of a single-colony selection have been deposited with the United States Department of Agriculture, Northern Utilization Research and Development Division, Peoria, Ill. and are being maintained in their permanent culture collection under the identification numbers NRRL 5338 and NRRL 5339, respectively. The two deposited subcultures are essentially equivalent in morphological and physiological characteristics. As used herein, the designation Nocardia sp. J327 refers to a microorganism having the characteristics described below and is not limited to a specific culture of the organism such as may be found in a particular culture collection.

The media and methods used for the characterization of the organism are from Ruth E. Gordon and Joan M. Mihm, The Journal of General Microbiology, 21, 736–748 (1959) and Ruther E. Gordon, ibid., 43, 329–343 (1966); from Society of American Bacteriologists, Manual of Microbiological Methods (1957) and from E. B. Shirling and D. Gottlieb, International Journal of Systematic Bacteriology, 16, 313–340 (1966). The incubation temperature is 28° C. unless otherwise indicated.

The organism is aerobic, Gram-positive, non-acid-fast, non-motile, and without endospores. The cells consist of rods and filaments which vary in size (0.5 to 1 by 1 to 25 microns) and shape (straight, bent, or curved). Branched, swollen, and coccal forms are observed and angular arrangements of the cells commonly occur. The colonies are filamentous, readily fragment, and do not form an aerial mycelium.

The above characteristics closely conform with those of the genus Nocardia as described in Bergey's Manual of Determinative Bacteriology, seventh edition (1957). It is, therefore, concluded that the organism belongs in this genus. Other characteristics which enable one to recognize Nocardia sp. J327 are as follows.

On tryptic soy agar, yeast extract-malt extract agar, and glycerol nutrient agar, the growth is moderate to abundant. The colonies range in size from 0.3 to 2 mm., are moderate orange-yellow to deep orange-yellow in color, and are raised, convex, smooth, round, glistening, moist, and butyrous. No aerial mycelium or soluble pigment is formed. Occasional yellowish-white colonies and dull, wrinkled, or folded, irregular spreading colonies occur.

On oatmeal agar, inorganic salts-starch agar, and glycerol-asparagine agar, the growth is sparse to moderate and is colorless to light yellow, and no aerial mycelium or soluble pigment is produced.

In glucose nutrient broth, a heavy deep orange-yellow flocculent to compact pellicle is formed. The broth is clear to slightly turbid and a yellowish sediment occurs.

In tryptic soy agar and glycerol nutrient agar slide cultures, the organism grows on surface and submerged. The larger colonies are round and smooth and surrounded by fragmented filaments. The smaller colonies are usually filamentous. Fragmentation of the mycelium is extensive and no aerial hyphae are formed.

Some additional characteristics of Nocardia sp. J327 are shown in the following Table 2.

TABLE 2

Characteristics of Nocardia sp. J327

| Property: | Reaction |
|---|---|
| Decomposition of— | |
| Casein | O |
| Gelatin | O |
| Tyrosine | O |
| Xanthine | O |
| Hydrolysis of starch | O |
| Reduction of nitrate to nitrite | O |
| Production of urease | + |
| Peptonization of litmus milk (basic) | O |
| Oxidation of glucose | + |
| Acid from— | |
| Adonitol | O |
| L-arabinose | + |
| Dulcitol | O |
| D-galactose | + |
| D-glucose | + |
| i-Inositol | O |
| Lactose | O |
| D-mannitol | + |
| D-mannose | + |
| Melibiose | O |
| α-Methyl-D-glucoside | O |
| Raffinose | O |
| Rhamnose | O |
| Salicin | + |
| Sorbitol | + |
| Sucrose | + |
| Trehalose | + |
| D-xylose | O |
| Growth at— | |
| 45° | O |
| 37° | O |
| 35° | + |
| 28° | + |
| 21° | + |
| 10° | + |

TABLE 2—Continued

| Property: | Reaction |
|---|---|
| Sensitivity to dyes: | |
| Methyl violet | + |
| Malachite green | — |
| Sensitivity to antibiotic sensitivity discs: | |
| Chloramphenical, 10 mcg. | + |
| Erythromycin, 5 mcg. | + |
| Kanamycin, 10 mcg. | + |
| Neomycin, 10 mcg. | + |
| Novobiocin, 10 mcg. | + |
| Penicillin, 5 units | + |
| Streptomycin, 5 mcg. | O |
| Tetracycline, 10 mcg. | + |
| Color change of MacConkey agar | O |

In accordance with the invention, myomycin including its individual components and acid-addition salts thereof is produced by inoculating an aqueous nutrient medium containing sources of assimilable carbon and nitrogen with Nocardia sp. J327 and incubating the inoculated medium at a temperature between about 20 to 35° C. under aerobic conditions. According to the usual method of operation, the aqueous nutrient medium is sterilized prior to inoculation and the incubation of the inoculated medium is carried out under aseptic, aerobic conditions until substantial antibacterial activity has been imparted to the fermentation mixture, following which myomycin is isolated in free base form or more desirably in acid-addition salt form by further treatment of the fermentation mixture. The preferred conditions for carrying out the fermentation are a temperature between 28 and 32° C. and a pH between 5.0 and 8.0, especially about 7.5.

Inoculum for the production of myomycin by the cultivation of Nocardia sp. J327 can be obtained by employing surface growth from slants of a nutrient agar medium. When incubated at a temperature between about 25 to 32° C., the organism grows and produces confluent growth on the agar surface in 4 to 9 days. If desired, the slant cultures can then be refrigerated and stored for at least 20 days. Generally 4 to 9-day agar slant cultures are used to inoculate a sterile aqueous nutrient medium contained in a suitable vessel such as a shaken flask or stirred and aerated fermentor. Alternatively, an aqueous suspension of the organism which has been rapidly frozen and stored at —20 to —40° C. can be thawed and used as inoculum for a fermentation. In order to produce a suitable growing seed culture, the organism after inoculation is allowed to grow for 24 to 96 hours with aeration and mixing at a temperature of 20 to 35° C., preferably 26 to 32° C. This growing seed is then used to inoculate either production fermentors or intermediate seed fermentors maintained at similar temperatures. If an intermediate seed fermentor is used, submerged aerobic growth of the organism is allowed to proceed for 16 to 72 hours and the growing seed is then used to inoculate larger production fermentors. The final fermentation is allowed to proceed until a suitable yield of myomycin can be obtained from the broth. The length of time required for the maximum yield varies with the size and type of equipment used, the rates of agitation and aeration, and other factors. In large scale fermentations carried out in tank-like fermentors, maximum production is usually reached in about 3 to 6 days. Aseptic conditions should be maintained during the growth and transfer of the organism.

As indicated above, suitable aqueous nutrient media are those containing sources of assimilable carbon and nitrogen. Sources of carbon which are assimilable and satisfactory for use include pure carbohydrates and polyhydric alcohols which can be utilized by the organism, as well as commercially-available carbohydrate mixtures. Some examples of materials which are suitable for this purpose are starch, dextrin, corn metal, glucose, and glycerol. The quantity of the carbohydrate or polyhydric alcohol present in the nutrient medium is not particularly critical and commonly varies from about 0.5 to 5% by weight of the medium. Quantities somewhat outside of this range can also be used.

The sources of nitrogen in the nutrient medium are usually of an organic or mixed organic-inorganic nature. Some examples of the many nitrogenous substances which can be employed are casein, soybean meal, cottonseed meal, peanut, meal, wheat gluten, barley and oat tailings, lactalbumin, tryptone, meat and fish peptones, ammonium salts, and nitrate salts. Due to the crude nature of many of the readily-available nitrogen sources, the quantity to be added to the medium varies according to the purity and it is not readily possibly to specify a definite quantity of nitrogenous source material which should be added to the medium. However, the nitrogenous source materials usually do not exceed 5 to 6% by weight of the total fermentation medium and in most cases they are present in a lower amount.

The presence of small amounts of auxiliary growth factors in the fermentation medium is also desirable. Some of those factors are already present in the ordinary crude organic nitrogen sources and need not be added separately. Alternatively, small amounts of such materials as distiller's solubles, yeast, yeast autolystate, yeast extract, and molasses fermentation residues; mineral salts such as sodium chloride, potassium phosphate, and magnesium sulfate; and salts of trace metals such as copper, cobalt, manganese, iron, and zinc, can be added to the fermentation mixture. A buffering agent, such as calcium carbonate, can be added to maintain the pH within the desired limits as the fermentation proceeds. An antifoaming agent can also be added as required.

The cultivation of Nocardia sp. J327 for the production of myomycin can be carried out in a number of different ways. For example, the organism can be cultivated under aerobic conditions on the surface of the medium; or it can be cultivated beneath the surface of the medium, that is in the submerged condition, provided that an adequate supply of oxygen is furnished. The preferred method for producing myomycin according to this invention is by the fermentation of Nocardia sp. J327 in a submerged or deep culture using efficient agitation and aeration.

The quantity of myomycin present in the broth after the fermentation period or at any time during the fermentation period can be determined by bioassay. The antibacterial activity (representing myomycin content) of the broth is determined by measuring the inhibition in the growth of the microorganism Bacillus subtilis. American Type Culture Collection 6633 (or other susceptible organism) by disc-plate assay and comparing the result with the inhibition caused by an appropriate dilution of a reference sample of purified myomycin (as acid-addition salt) obtained as described hereinafter. In the same manner, the purity of various myomycin preparations is determined by comparing the antibacterial activity against that of a purified sample. As is well-known in the art, this procedure is subject to certain experimental errors. A purity of 900 micrograms/mg. or higher, as determined by bioassay, is not regarded as significantly different from a compeltely purified product.

At the completion of the fermentation period, myomycin or more desirably an acid-addition salt thereof can be obtained from the broth by procedures described below and can be subjected to the degree of further purification desired, including separation into the components myomycin A, myomycin B, and myomycin C.

Myomycin can be obtained from the broth in any of a number of ways. For example, calcium ions are removed by adding oxalic acid or ammonium oxalate and filtering to separate insoluble calcium oxalate. The filtered broth is treated with a carboxylic acid resin with periodic addition of aqueous ammonia to maintain the pH at about 6.5. Adsorbed myomycin is recovered in the form of acid-addition salt by elution of the resin with dilute mineral acid. For further purification, the myomycin acid-addition salt is readsorbed on activated carbon and recovered by elution with water and with aqueous acetone. Other resins and adsorbing agents can also be used. According to another method of purification, an aqueous solution of myomycin sulfate is treated with p-(2-hydroxy-1-naphthylazo)benzenesulfonic acid sodium salt and the insoluble salt which forms is collected on a filter. The insoluble salt is dissolved in 90% methanol and reconverted to myomycin sulfate of a higher degree of purity by treatment with excess triethylamine sulfate.

Myomycin (mixture of components) can be separated into myomycin A, myomycin B, and myomycin C, preferably as acid-addition salts, by a number of different methods. According to one method, partially purified myomycin (sulfate salt, mixture of components) is adsorbed on an activated carbon column and fractionally eluted with water followed by 10% acetone and by 20% acetone. In general, the order of elution is myomycin C sulfate followed by myomycin B sulfate and then by myomycin A sulfate. However, it is difficult to obtain a sharp separation by this method because the C and A components are overlapped by the predominant B component.

According to a more discriminating method, myomycin (mixture of components) is separated into its individual components by thin layer chromatography on silica gel. An example of a silica gel sheet suitable for this purpose is one known as ChromAR–500. An initial sample of at least 30 micrograms of myomycin sulfate (mixture of components) is applied to the silica gel sheet which is then developed with a mixture of 95% ethanol/water/acetic acid:2M ammonia (79:21:5:10). Zones corresponding to each of the components, as acid-addition salts, are identified by (a) a purple coloration developed by treating with 0.2% ninhydrin in acetone containing 10% pyridine or (b) inhibition of the growth of Bacillus subtilis ATCC 6633. Using the above system, the $R_f$ of the myomycin A component is 0.21. The $R_f$ of the myomycin B component is 0.41. The $R_f$ of the myomycin C component is 0.63.

Myomycin and its components can be converted to pharmaceutically-acceptable acid-addition salts with any of a variety of organic and inorganic acids as indicted previously. The acid-addition salts can be converted to the free base forms by making an aqueous solution basic, by anion exchange on a resin, or by precipitation reactions such as treating a sulfate salt with barium hydroxide in order to remove the sulfate ion and leave the free base in solution.

The compounds of the invention can exist in anhydrous form as well as in solvated, including hydrated, forms. In general, the hydrated forms and the solvated forms with pharmaceutically-acceptable solvents are equivalent to the anhdrous or unsolvated form for the purposes of the invention. To illustrate the relationship between hydrated and anhydrous forms, myomycin B sulfate, in its normal state as obtained by drying at room temperature, has microanalytical values corresponding approximately to a dihydrate. Substantially anhydrous myomycin B sulfate is obtained by drying to constant weight at 110° C. in vacuo. Upon microanalysis, a sample dried in this manner showed 34.71% carbon; 6.21% hydrogen; and 13.59% nitrogen.

Myomycin, its individual components, and acid-addition salts thereof are antibacterial agents having a wide spectrum of antibacterial activity against gram-positive and gram-negative organisms. The usual form for administration is as an acid-addition salt of myomycin B either alone or in combination with either or both of an acid-addition salt of myomycin A and an acid-addition salt of myomycin C. The products are effective against a variety of gram-positive cocci, coliform bacilli, and enteric bacilli. They are of particular value for their activity against certain gram-negative organisms. This activity has been demonstrated in vivo in mice having an established sub-acute Salmonella typhimurium infection. Subcutaneous administration of myomycin sulfate (mixture of components) beginning four days following onset of infection, resulted in a clearing of the infection. The dose consisted of 250 mg./kg. given twice daily in two five-day series, separated by a two-day interval in which no drug was administered. The products are also effective against other species of Salmonella. They are effective by either oral, parenteral, or topical administration. As an example of a product for topical use, an acid-addition salt of myomycin B is dispersed as a 1% suspension in an ointment base.

Rats were given single, daily, subcutaneous doses of myomycin sulfate (approximately 92–95% component B; 5–8% component C) for 28 days. The doses studied were 80 mg./kg., 160 mg./kg., and 320 mg./kg., free base equivalent, each day. After the 28-day test period the kidneys of all animals receiving those doses were pale and enlarged, and microscopically showed generalized nephrosis and lower nephron necrosis. This finding should be taken into account in connection with use of myomycin.

Because of their wide antibacterial spectrum, the products of the invention are also useful as antibacterial agents in in vitro applications such as sterilizing laboratory instruments and surfaces, sterilizing pharmaceutical products, and maintaining sterile conditions during pharmaceutical manufacturing operations. For sterilizing laboratory instruments and surfaces and similar in vitro applications, the products can be used in the form of a 0.1 to 1.0% aqueous solution.

The invention is illustrated by the following examples.

Example 1

Stage I: Four slant cultures of Nocardia sp. J327 are prepared on a sterile agar medium having the following composition.

|  | G. |
|---|---|
| Peptone derived from casein by pancreatic digestion | 15 |
| Papaic digest of soya meal | 5 |
| Sodium chloride | 5 |
| Agar | 15 |

Distilled water, 1 liter.

In each case the slant is inoculated with a freeze-dried culture of the organism suspended in sterile distilled water, and is then incubated at 28° C. for 9 days. The growth from each slant is suspended in 10 ml. of sterile distilled water.

Stage II: A nutrient medium having the following composition (weight/volume) is prepared.

|  | Percent |
|---|---|
| Glucose monohydrate | 2.0 |
| Soybean meal, 44% protein (solvent extracted) | 1.0 |
| Animal peptone | 0.5 |
| Ammonium chloride | 0.2 |
| Sodium chloride | 0.5 |

Water to make 100%.

Twelve liters of this medium is placed in a 30-liter fermentor and adjusted to pH 7.5 with 10 N sodium hydroxide, following which 0.25% (weight/volume) of calcium carbonate is added. It is heated at 121° C. for 90 minutes, allowed to cool, and inoculated with 40 ml. of the cell suspension of Nocardia sp. J327, prepared as described in Stage I. The inoculated medium is incubated at 29–30° C. for 57 hours while being stirred at 200 revolutions per minute and aerated with sterile air supplied at the rate of 12 liters per minute. About 24 g. of a mixture of lard and mineral oils containing mono- and diglycerides is added in portions as required during this time to prevent excessive foaming.

Stage III: Sixteen liters of a medium having the same composition as in Stage II but containing in addition 1.0% (weight/volume) of glycerol and 0.5% (weight/volume) of distiller's solubles is placed into each of four fermentors, sterilized by heating at 121° C. for 90 minutes, and allowed to cool. Each fermentor is inoculated with 800 ml. of the growing 57-hour old culture from Stage II and incubated at 30° C. while being stirred at 200 revolutions per minute and aerated with sterile air at the rate of 16 liters per minute. Theh incubation is continued for 96 hours in two of the fermentors and for 120 hours in the other two fermentors. Antifoaming agent is added as required.

Isolation and purification of product: The broths from Stage III are combined and filtered. A quantity of the filtrate amounting to 51.8 liters is stirred with one liter of carboxylic acid resin in the free acid from. A resin such as Amberlite IRC–50 in dry bead form can be used. Stirring is continued for 14 hours while the mixture is maintained at pT 6.4±0.4 by periodic addition of 14% aqueous ammonia. After standing overnight at 5° C., the mixture is poured into a 6 cm.-diameter column. The resin in the column is washed with 10 liters of water and the myomycin is then eluted with 0.6 N hydrochloric acid by collecting the eluate in fractions of approximately 1.9 liters each. Most of the myomycin is eluted between 3.8 and 7.5 liters of eluate. Those fractions are combined, adjusted to pH 6.5 with sodium hydroxide, and filtered. The filtrate is adjusted to pH 5.2 with hydrochloric acid and concentrated to a volume of 1.3 liters in vacuo. This solution is freeze-dried and the residue stirred with 165 ml. of 90% methanol (volume/volume). The insoluble material is removed by filtration and washed with 200 ml. of cold 90% methanol. The filtrate and wash are combined and concentrated to a thick slurry which is diluted with 100 ml. of methanol. This mixture is filtered and the solid material (mostly inorganic salts) washed with 70 ml. of 90% methanol and then 60 ml. of methanol. The filtrate and wash are combined and concentrated almost to dryness to remove the methanol. The residue is dissolved in 2 liters of water and the solution treated with 220 ml. of 2 M pH 6.6 phosphate buffer. A gelatinous precipitate is removed by filtration using acid-washed diatomaceous earth. The filtrate is adjusted to pH 6.8 with sodium hydroxide and then stirred for one hour with 400 g. of activated carbon. A product such as Darco G–60 can be used. This mixture is filtered and the carbon washed with 9 liters of water. The carbon (which now contains the product) is stirred with 1.6 liters of 25% acetone (volume/volume) while the pH is maintained at 2.3 by the addition of 2 N sulfuric acid. The resulting mixture is filtered and the solid washed with 1.6 liters of 25% acetone previously adjusted to pH 2.5 with sulfuric acid. The filtrate (which now contains the product) and wash are combined, adjusted to pH 5 with anion exchange resin, concentrated, and freeze-dried. A suitable anion exchange resin is Amberlite IR–45 in the hydroxyl form. The gummy residue is dissolved in 70 ml. of water and any insoluble material is removed by filtration and washed with 20 ml. of water. The filtrate and wash are combined and treated with 500 ml. of methanol and 4 ml. of 50% triethylamine sulfate (weight/volume). The mixture is diluted to 950 ml. with methanol and chilled overnight at 5° C. The insoluble precipitate is collected on a filter and washed with methanol. It is myomycin sulfate (mixture of components). By bioassay against Bacillus subtilis it has a purity of 340 micrograms/mg. If desired, a product of higher purity is obtained by following the Orange II salt procedure described elsewhere herein.

Example 2

Stage I: Four slant cultures of Nocardia sp. J327 are prepared on a sterile agar medium having the composition as given in Example 1, Stage I. The slants are incubated at 28° C. for 6 days and the growth from each slant is suspended in 10 ml. of sterile distilled water.

Stage II: A nutrient medium having the following composition (weight/volume) is prepared.

| | Percent |
|---|---|
| Glucose monohydratee | 2.0 |
| Glycerol | 1.0 |
| Soybean meal, 44% protein (solvent extracted) | 1.0 |
| Animal peptone | 0.5 |
| Distiller's solubles | 0.5 |
| Ammonium chloride | 0.2 |
| Sodium chloride | 0.5 |

Water to make 100%.

Twelve liters of this medium is placed in a 30-liter fermentor and adjusted to pH 7.5 with 10 N sodium hydroxide, following which 0.25% (weight/volume) calcium carbonate is added. The medium is sterilized by heating at 121° C. for 90 minutes, allowed to cool, inoculated with 40 ml. of the cell suspension from Stage I, and incubated at 30° C. for 56 hours while being stirred at 200 revolutions per minute and aerated with sterile air supplied at the rate of 12 liters per minute. Antifoaming agent is added as required.

Stage III: Twenty gallons of a nutrient medium having the same composition as given in Stage II is placed in a 50-gallon fermentor. The medium is sterilized at 121° C. for 90 minutes, allowed to cool, and inoculated with 400 ml. of the growing 56-hour old culture from Stage II. The inoculated medium is incubated at 30–31° C. for 40 hours with aeration at a rate of 9.5 cubic feet per minute and addition of an antifoaming agent as required.

Stage IV: One-hundred fifty gallons of the nutrient medium as described in Stage II, and 3 liters of antifoaming agent (mixture of lard and mineral oils containing mono- and diglycerides) are placed into each of two 200-gallon fermentors. The medium in each fermentor is sterilized with heat, cooled, and inoculated with 10 gallons of the growing 40-hour old seed culture from Stage III. Incubation in each fermentor is carried out at 28–32° C. for 103 hours with efficient agitation and aeration at a rate of 34 cubic feet of air per minute. Additional antifoaming agent is added as required.

Isolation and purification of product: The broths from Stage IV are combined and the combined broth (300 gallons; pH 6.2) is stirred for ½ hour with 4.5 kg. of oxalic acid. The pH is adjusted from 2.1 to 6.0 with 7 liters of concentrated aqueous ammonia. The mixture is allowed to stand overnight at 5° C., stirred with 100 pounds of diatomaceous earth, and filtered. A product such as Celite 545 can be used. The filtrate is treated with a total of 34 liters of carboxylic acid resin in the free acid form. A resin such as Amberlite IRC–50 can be used. Stirring is carried out for 2 hours while the pH is maintained between 6 and 6.5 by periodic additions of aqueous ammonia. The resin (which now contains the product) is separated, washed with 50 gallons of deionized water, and charged into a 6 inch-diameter column. The column is washed with deionized water until the effluent is clear, and the myomycin is eluted with 0.6 N sulfuric acid. The portion of the eluate containing most of the product is identified by bioassay. (In this case it was the fourth 20-liter fraction.) It is diluted to 15 gallons with water, adjusted to pH 6 with 10 N sodium hydroxide, and treated with 5.95 kg. of activated carbon and 4.5 kg. of diatomaceous earth. Products such as Darco G–60 and Celite 545 can be used. The mixture is stirred for one hour and then filtered in a plate and frame filter. The carbon cake (which now contains the product) is washed with 8 gallons of water and partially dried. The carbon cake is then resuspended in 15 gallons of 25% acetone at pH 2.5 and the mixture stirred for ½ hour while the pH is maintained at 2.5 by periodic additions of dilute sulfuric acid. The mixture is filtered and the carbon cake re-extracted with 11 gallons of 25% acetone at pH 2.5. Both 25% acetone extracts (which now contain the product) are combined and adjusted to pH 5 with anion exchange resin in the hydroxyl form. A product such as Amberlite IR–45 can be used. The aqueous acetone solution is concentrated to 800 ml. in vacuo. The concentrate is filtered through a fine fritted-glass filter and the filtrate is treated with 8 liters of methanol and 10 ml. of 50% triethylamine sulfate solution. The mixture is allowed to stand overnight at 5° C. and the insoluble product is collected on a filter and dried. It is myomycin sulfate (mixture of components) having a purity by bioassay of 515 micrograms/mg.

If a more highly purified product is desired, a solution of 50 g. of the product as obtained above in one liter of water is stirred with a solution of 54.4 g. of p-(2-hydroxy-1-naphthylazo)benzenesulfonic acid sodium salt (also known as Orange II) in 1.47 liters of water. The mixture is stored for 3 days at 5° C. and the insoluble Orange II salt is collected on a filter, washed with 1.5 liters of water, and dissolved in 22.5 liters of hot 50% methanol. A small amount of insoluble material is removed by filtration of the hot solution and the filtrate is stored at 5° C. for 2 days. The insoluble product is collected on a filter, washed with 1.5 liters of water, and dissolved in 28 liters of hot 90% methanol. A small amount of red-orange oil is removed by decantation. The solution is cooled to 40° C. and stirred with 62 ml. of a 36% solution of triethylamine sulfate. This mixture is stored at 5° C. overnight and the insoluble product is collected on a filter, washed with one liter of methanol, and redissolved in 0.45 liter of water. The solution at pH 4.8 is passed over 230 ml. of anion exchange resin in the sulfate form. A product such as Dowex 1 X2 can be used. The effluent is combined with 0.65 liter of water wash and stirred with 4.3 g. of activated carbon. A material such as Darco G–60 can be used. The carbon is removed by filtration and the filtrate (which contains the product) is freeze-dried to give a residue of purified myomycin sulfate (mixture of components) having a purity by bioassay of 975 micrograms/mg. By thin layer chromatography, as described elsewhere herein, it is separated as acid-addition salt into myomycin A (about 10% or less), myomycin B (about 80% or more), and myomycin C (about 10% or less).

Example 3

Stage I: Slant cultures of Nocardia sp. J327 (from a single-colony selection of the original isolate) are prepared as in Example 1, Stage I, and the growth is used to inoculate a seed fermentor as in Example 1, Stage II. The culture in the seed fermentor is incubated for 48 hours at 30° C. with efficient stirring and aeration at a rate of 12 liters per minute. After the incubation period, 100 ml. portions of the growing culture are withdrawn into sterile flasks, rapidly frozen, and stored at —20 to —40° C. until used.

Stage II: A nutrient medium having the following composition (weight/volume) is prepared.

| | Percent |
|---|---|
| Glucose monohydrate | 2.0 |
| Soybean meal, 44% protein (solvent extracted) | 1.0 |
| Animal peptone | 0.5 |
| Ammonium chloride | 0.2 |
| Sodium chloride | 0.5 |

Water to make 100%.

Twelve liters of this medium is placed in a 30-liter fermentor and adjusted to pH 7.5 with 10 N sodium hydroxide, following which 0.25% (weight/volume) of calcium carbonate is added. It is heated at 121° C. for 90 minutes, allowed to cool, and inoculated with 100 ml. of a thawed cell suspension of Nocardia sp. J327 from Stage I. The inoculated medium is incubated at 29–30° C. for 73 hours with agitation and aeration at a rate of 12 liters per minute. Antifoaming agent is added as required.

Stage III: Fifteen gallons of a nutrient medium having the same composition as in Stage II is heat sterilized in a 30-gallon fermentor, cooled, and inoculated with 3,500 ml. of the growing 73-hour old culture from Stage II. The inoculated medium is incubated at 28–30° C. for 23 hours with aeration at a rate of 6.3 cubic feet per minute. Antifoaming agent is added as required.

Stage IV: A nutrient medium having the following composition (weight/volume) is prepared.

|  | Percent |
|---|---|
| Glucose monohydrate | 2.0 |
| Soybean meal, 44% protein (solvent extracted) | 1.0 |
| Animal peptone | 0.5 |
| Distiller's solubles | 0.1 |
| Ammonium chloride | 0.2 |
| Sodium chloride | 0.5 |
| Water to make 100%. | |

Three hundred gallons of the medium is adjusted to pH 7.5 with 10 N sodium hydroxide, following which 0.25% (weight/volume) of calcium carbonate and 3 liters of a mixture of lard and mineral oils containing mono- and diglycerides are added. The medium is heat sterilized in a fermentor, cooled, and inoculated with 15 gallons of the growing 23-hour old culture from Stage III. The mixture is incubated for 21 hours at 29.5–31° C. with agitation and aeration at a rate of 45 cubic feet per minute. Additional antifoaming agent is added as required.

Stage V: A nutrient medium having the following composition (weight/volume) is prepared.

|  | Percent |
|---|---|
| Glucose monohydrate | 3.0 |
| Soybean meal, 44% protein (solvent extracted) | 1.0 |
| Animal peptone | 0.5 |
| Distiller's solubles | 0.1 |
| Ammonium chloride | 0.2 |
| Sodium chloride | 0.5 |
| Water to make 100%. | |

The medium is adjusted to pH 7.5 with 10 N sodium hydroxide, following which 0.25% (weight/volume) of calcium carbonate is added. A quantity of 1,200 gallons of this medium and 10 liters of antifoaming agent are placed into each of two 2,000-gallon fermentors. An additional 0.1% (weight/volume) of ammonium chloride is added to each fermentor. In one case it is added initially; in the other case it is sterilized separately and added after 48 hours of incubation. Each fermentor is sterilized with heat, cooled, inoculated with 150 gallons of the growing 21-hour old culture from Stage IV, and incubated with agitation and aeration at 84 cubic feet per minute for 98 hours at 29.5–32° C. Additional antifoaming agent is added as required.

Isolation and purification of product: The broths from Stage V are combined (2,530 gallons), stirred with 120 pounds of ammonium oxalate for 3 hours, chilled and held at 5° C. for 3 days, treated with 350 pounds of diatomaceous earth, and filtered in a filter press. A product such as Celite 545 can be used. The filtrate is stirred for 15 hours with 95 liters of carboxylic acid resin in the free acid form. A resin such as Amberlite IRC–50 can be used. The pH of the resin mixture is held at 6–6.5 by periodic addition of aqueous ammonia. The resin with product adsorbed is allowed to settle, collected by discarding the supernatant liquid, and charged into a 12-inch diameter column. The resin in the column is washed with 100 gallons of water. The myomycin is then eluted from the column with 0.6 N sulfuric acid and the eluate is adjusted to pH 5 with weakly basic anion exchange resin in the hydroxyl form. A resin such as Amberlite IR–45 can be used. The resin is removed by filtration and the filtrate (which now contains the product) is concentrated in vacuo to a volume of 18.7 liters and poured onto a column containing 47 kg. of activated carbon and 40 kg. of diatomaceous earth. The activated carbon is one that has been previously washed with dilute acid and with water; in addition the packed column is washed with 25 gallons of deionized water before the myomycin solution is charged onto the column. Products such as Darco G–60 and Celite 545 are satisfactory. The column is developed and eluted with 2,300 liters of water collected in fractions, followed by 208 liters of 10% acetone and then by 320 liters of 20% acetone. In order to locate the myomycin (acid-addition salt) product, a small portion of each eluate fraction is chromatographed on silica gel thin layer plates using 95% ethanol-water-acetic acid-2 M ammonia (79:21:5:10). The myomycin A, B, and C zones are detected by their antibacterial action again *Bacillus subtilis*, American Type Culture Collection 6633. The growth medium consists of 5 g. of beef extract, 10 g. of peptone, 2.5 g. of sodium chloride, and 15 g. of agar, dissolved in 1,000 ml. of distilled water. In a typical elution sequence, the first 189 liters of water eluates contained no product. The next 685 liters of eluate contained a mixture of myomycin B and myomycin C. The following 1,425 liters of eluate contained myomycin B substantially free of the A and C components. After elution with water has been completed, as described above, fractions containing a mixture of myomycin A and myomycin B are obtained by elution with water containing 10% acetone and with water containing 20% acetone.

The eluates having a volume of 685 liters, as described above, and containing as acid-addition salt a mixture of myomycin B and myomycin C, are combined, concentrated to a volume of 9 liters, and chilled to 5° C. Insoluble impurities are removed by filtration and the filtrate is poured onto a column of 250 ml. of strong cation exchange resin, sulfonic acid type. A resin such as Dowex 50 X16 in free acid form is satisfactory. The column is developed and eluted with water. The eluate fractions containing myomycin are combined, adjusted to pH 5 with weakly basic anion exchange resin in the hydroxyl form (such as Amberlite IR–45), filtered to remove the resin, and given a final filtration through a cellulose ester membrane filter. An 8 micron pore size Millipore membrane is satisfactory. The filtrate is concentrated to dryness in vacuo to give a residue of purified myomycin sulfate (mixture of components B and C); $[\alpha]_D^{25} = -3.2°$ (1.0% in water). By bioassay against *Bacillus subtilis* it has a purity of 993 micrograms/mg.

The first 256 liters of eluate containing myomycin B substantially free of the A and C components (from the 1,425 liters of eluate as described above) is concentrated to a volume of one liter and poured over a column of 75 ml. of strong cation exchange resin, sulfonic acid type. A resin such as Dowex 50 X16 in the free acid form is satisfactory. The product is eluted from the column with water and the aqueous eluates are adjusted to pH 5, filtered from the resin and then through a cellulose ester membrane filter, and concentrated to dryness in vacuo. The product is myomycin B sulfate; $[\alpha]_D^{25} = -4.9°$ (1.03% in water). By bioassay against *Bacillus subtilis* it has a purity of 940 micrograms/mg.

We claim:
1. Acid-addition salts of myomycin B, said myomycin B being a basic substance containing the elements carbon, hydrogen, oxygen, and nitrogen; said acid-addition salts being exemplified by the sulfate which in normal hydrated form is found by analysis to contain 33.81% carbon, 6.26% hydrogen, 13.32% nitrogen, and 6.49% sulfur; upon chemical degradation yields myo-inositol, L-β-lysine, x - (3) - deoxy - 3 - guanidino-D-mannopyranosyl)-myo-inositol, N-(L-β-lysyl)-L-β-lysine, biscarbamoyl derivative of x-(3-deoxy-3-guanidino-D-mannopyranosyl)-myo-inositol, x - (3 - deoxy-3-ureido-D-mannopyranosyl)-myo-inositol, x - (3 - amino-3-deoxy-D-mannopyranosyl)-myo-inositol, and 3-amino-3-deoxy-D-mannose; has a p$K'_a$ value of substantially 8.0 in water; exhibits no ultraviolet absorption maxima between 220 and 360 millimicrons; and exhibits a characteristic infrared absorption spectrum in potassium bromide as shown in the drawing with absorption maxima at 3420 (broad), 2940, 1735,

1645, 1498, 1458, 1405, 1350, 1074, 975, 702, and 617 reciprocal centimeters.

2. A product according to claim 1 and additionally containing an acid-addition salt of myomycin A.

3. A product according to claim 1 and additionally containing an acid-addition salt of myomycin C.

4. A product according to claim 1 and additionally containing an acid-addition salt of myomycin A and an acid-addition salt of myomycin C.

5. A product according to claim 1 which is myomycin B sulfate.

References Cited

UNITED STATES PATENTS

| | | | |
|---|---|---|---|
| 3,541,078 | 11/1970 | Woo et al. | 260—210 R |
| 3,647,779 | 3/1972 | Schmitz | 260—210 AB |

JOHNNIE R. BROWN, Primary Examiner

U.S. Cl. X.R.

195—117; 260—112.5